US010128544B2

United States Patent
Cutright et al.

(10) Patent No.: US 10,128,544 B2
(45) Date of Patent: Nov. 13, 2018

(54) COOLING FOR BATTERY UNITS IN ENERGY STORAGE SYSTEM

(71) Applicant: General Electric Company, Schenectady, NY (US)

(72) Inventors: Richard Hayes Cutright, Corinth, NY (US); Kenneth McClellan Rush, Ballston Spa, NY (US); Joshua Paul Webb, Schenectady, NY (US); Thomas Joseph Horgan, Gansevoort, NY (US); Michael Stanley Zanoni, Glens Falls, NY (US)

(73) Assignee: General Electric Company, Schenectady, NY (US)

( * ) Notice: Subject to any disclaimer, the term of this patent is extended or adjusted under 35 U.S.C. 154(b) by 185 days.

(21) Appl. No.: 14/843,351

(22) Filed: Sep. 2, 2015

(65) Prior Publication Data
US 2017/0062885 A1 Mar. 2, 2017

(51) Int. Cl.
*H01M 10/42* (2006.01)
*H01M 10/663* (2014.01)
*H01M 10/65* (2014.01)
*H01M 10/66* (2014.01)

(52) U.S. Cl.
CPC ......... *H01M 10/425* (2013.01); *H01M 10/65* (2015.04); *H01M 10/66* (2015.04); *H01M 10/663* (2015.04)

(58) Field of Classification Search
CPC .... H01M 10/425; H01M 10/65; H01M 10/66; H01M 10/663
See application file for complete search history.

(56) References Cited

U.S. PATENT DOCUMENTS

| 4,947,123 A * | 8/1990 | Minezawa ......... G01R 31/3624 320/136 |
| 5,548,201 A * | 8/1996 | Grabon ................. H02J 7/0091 320/150 |
| 2009/0234598 A1* | 9/2009 | Angquist .............. H01M 10/39 702/63 |

(Continued)

FOREIGN PATENT DOCUMENTS

| EP | 1531335 A2 * | 5/2005 | ......... G01R 31/3651 |
| JP | 08148190 A * | 6/1996 | |

(Continued)

OTHER PUBLICATIONS

J-PlatPat Machine Translation of the detailed description of JP 08-148190A (Jun. 1996).*

(Continued)

*Primary Examiner* — Gregg Cantelmo
(74) *Attorney, Agent, or Firm* — Dority & Manning, P.A.

(57) ABSTRACT

Systems and methods for controlling the temperature of an energy storage system are provided. More specifically, a time period of increased battery temperature attributable to, for instance, charging or discharging of the battery can be identified. A control system can be used to reduce the ambient temperature of a space associated with the battery energy storage devices in the time period prior to or immediately before the period of increased battery temperature. The ambient temperature can be maintained at a nominal ambient temperature at other times.

9 Claims, 5 Drawing Sheets

(56) References Cited

U.S. PATENT DOCUMENTS

2011/0316486 A1* 12/2011 Inaba ...................... B60L 1/003
                                                          320/150
2014/0121866 A1*  5/2014 Dangler ................ H02J 7/0029
                                                          701/22

FOREIGN PATENT DOCUMENTS

JP        2007336691 A   * 12/2007
JP        2010058635 A   *  3/2010

OTHER PUBLICATIONS

J-PlatPat Machine Translation of the detailed description of JP 2007-336691A (Dec. 2007).*

J-PlatPat Machine Translation of the detailed description of JP 2010-058635A (Mar. 2010).*

* cited by examiner

COOLING FOR BATTERY UNITS IN ENERGY STORAGE SYSTEM

FIELD OF THE INVENTION

The present subject matter relates generally to energy storage systems and more particularly, to ambient temperature control for battery units in energy storage systems.

BACKGROUND OF THE INVENTION

Energy storage systems (e.g., battery energy storage systems) have become increasingly used to deliver power either as part of standalone energy storage systems or as part of a power generation systems (e.g., a wind farm, solar farm, gas turbine system) with an integrated energy storage system. Energy storage systems can include one or more battery banks that can be coupled to the grid or other load via a suitable power converter. Energy storage systems are unique in that energy storage systems have the ability to both deliver and reserve energy for particular services.

Battery performance and life of the energy storage system can be dependent on operating temperature. For instance, a battery having a ten year life while operating at 25° C. may only have a three year life when operating at 45° C. When batteries are charged and discharged, the batteries can generate heat both internally and externally via associated electrical connections. In some cases, the heat can be associated with resistance losses that increase significantly as the batteries operate at higher currents and higher powers. This effect can be magnified because operating at higher temperatures can accelerate failure modes that increase with cell resistance, which can cause an additional increase in temperature for a given power level.

Operation and temperature control of large scale energy storage systems can include regulating the ambient temperature of the room or space having the energy storage devices to a constant temperature (e.g., 25° C.). In some applications, the constant temperature set point can be in the range between 18° C. and 35° C. Maintaining the temperature can result in operating costs (e.g. HVAC costs) to maintain the ambient condition in the battery space.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method for regulating a temperature of an energy storage system. The method includes accessing, by one or more control devices, data associated with a battery charge profile for one or more battery energy storage devices and identifying, by the one or more control devices, a period of increased battery temperature from the battery charge profile. The method further includes controlling, by the one or more control devices, a cooling system associated with the one or more battery energy storage devices based at least in part on the period of increased battery temperature to reduce the ambient temperature of a space associated with the one or more battery energy storage devices prior to the period of increased battery temperature.

Another example aspect of the present disclosure is directed to a battery energy storage system. The battery energy storage system includes one or more battery energy storage devices and a cooling system configured to control an ambient temperature of a space associated with the one or more battery energy storage devices. The battery energy storage system further includes one or more control devices configured to identify a period of increased battery temperature and to control the cooling system to reduce the ambient temperature of a space associated with the one or more battery energy storage devices prior to the period of increased battery temperature.

Yet another example aspect of the present disclosure is directed to a control system for an energy storage system. The control system includes one or more processors and one or more memory devices. The one or more memory devices store computer-readable instructions that when executed by the one or more processors cause the one or more processors to perform operations. The operations include receiving data indicative of one or more operating parameters associated with one or more battery energy storage devices; and determining data indicative of increased heat generation of the one or more battery energy storage devices based at least in part on the one or more operating parameters using a model. The model can specify heat generation as a function of the one or more operating parameters. The operations can further include controlling the cooling system to provide increased cooling of the one or more battery energy storage devices based at least in part on the data indicative of heat generation.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
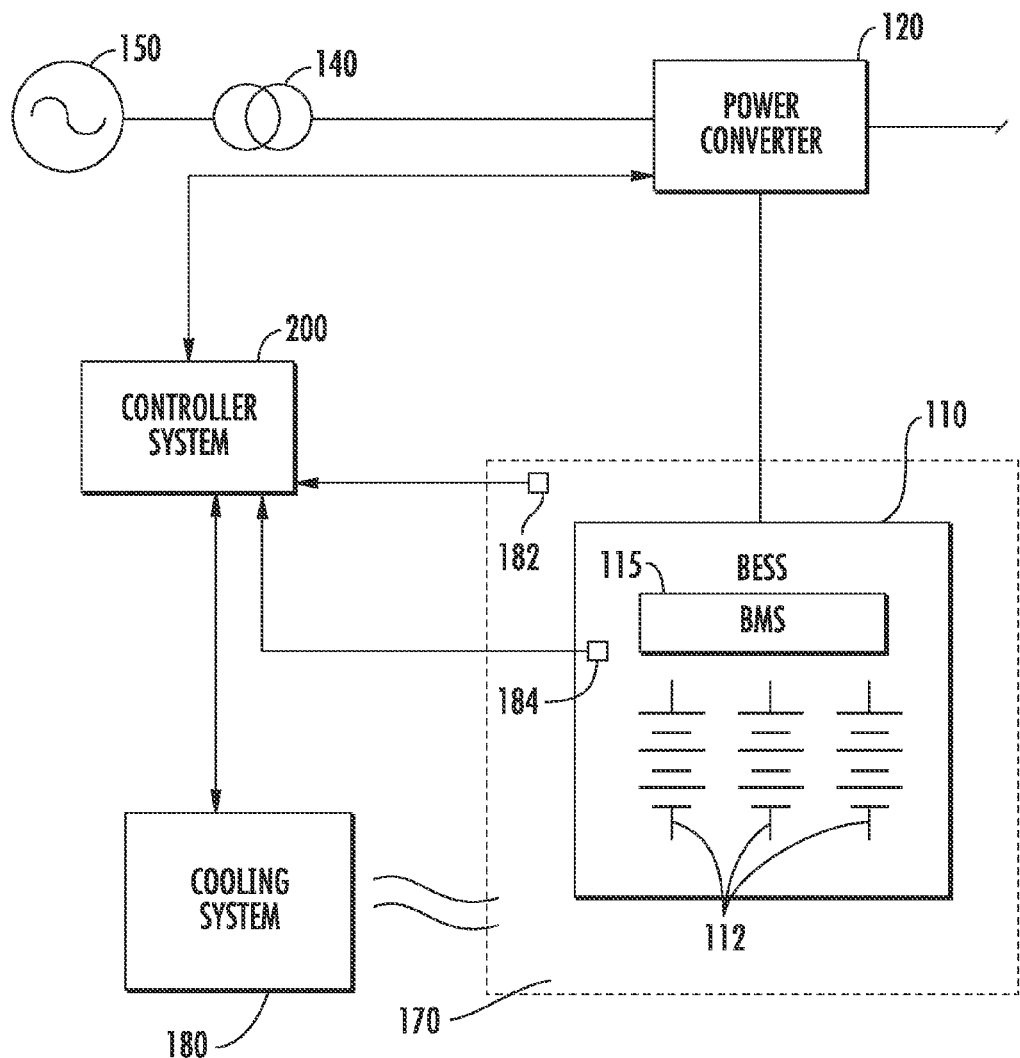
FIG. 1 depicts an energy storage system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to controlling the temperature of an energy storage system to increase battery life and performance of battery energy storage devices. More specifically, a time period of increased battery temperature attributable to, for instance, charging or discharging of the battery can be identified. A control system can be used to control a cooling system to reduce the ambient temperature of a space associated with the battery energy storage devices in a pre-cooling period prior to or immediately before the period of increased battery temperature. The ambient temperature can be maintained at a nominal ambient temperature at other times.

In addition and/or in the alternative, various operating parameters (e.g., ambient temperature, current, battery temperature, state of charge, etc.) of the battery energy storage devices can be monitored and used to predict or determine heat generation characteristics of the battery energy storage devices. During periods of increased heat generation, the cooling system can be controlled to provide increased cooling for the battery energy storage devices. In some cases, the cooling system can provide increased cooling in an amount proportional to the increased heat generation.

For instance, in one implementation, data indicative of a battery charge profile can be identified. The data indicative of a battery charge profile can include data specifying one or more time periods when the battery is going to be charging and/or one or more time periods when the battery is going to be discharging. In one embodiment, the battery charge profile can be a preset battery charge profile that specifies specific times during a given day or other time period that a battery is to be charged or discharged. In other embodiments, the battery charge profile can be a predicted battery charge profile that predicts time periods of increased battery temperature based on various operational parameters, such as data indicative of power demands, current state of charge, future conditions (e.g. weather) and other data. For instance, model predictive control techniques can be used to determine an estimated battery charge profile based on operational parameters and constraints associated with the energy storage system.

A time period of increased battery temperature can be identified based on the battery charge profile. The time period of increased battery temperature can correspond to charging or discharging the one or more battery energy storage devices. Once identified, a cooling system (e.g., an HVAC system or other suitable system) can be controlled to reduce the ambient temperature of a space associated with the one or more energy storage devices for a time period prior to or before (e.g., during a pre-cooling period) the period of increased battery temperature. For instance, an ambient temperature set point can be reduced from a nominal temperature set point to an adjusted temperature set point during the time period before the period of increased battery temperature.

The reduction in ambient temperature can reduce the temperature of the one or more battery energy storage devices prior to the period of increased battery temperature. As a result, the peak temperature of the battery energy storage devices resulting from charging or discharging the battery can also be reduced. In this way, the systems and methods of the present disclosure can have a technical effect of reducing the average battery temperature and peak temperatures of the battery energy storage devices without causing excessive energy costs associated with constantly maintaining a reduced ambient temperature.

According to additional example aspects of the present disclosure, the cooling system can be controlled based on predicted heat generation of the battery energy storage devices using a model correlating various operating parameters to heat generation increased by the battery temperature. When the model predicts an increase in heat generation, the cooling system can be controlled to provide additional cooling to the space associated with the battery energy storage devices to reduce any temperature increase of the battery energy storage devices.

With reference now to the Figures, example embodiments of the present disclosure will now be discussed in detail. FIG. 1 depicts an example power system 100 that includes an energy storage system 110 according to example aspects of the present disclosure. The power system 100 can be a standalone power system or can be implemented as part of a power generation energy system, such as a wind power generation system, solar power generation system, gas turbine power generation system, or other suitable system.

The power system 100 can include a battery energy storage system (BESS) 110. The BESS 110 can include one or more battery energy storage devices 112, such battery cells or battery packs. The battery energy storage devices 112 can contain one or more sodium nickel chloride batteries, sodium sulfur batteries, lithium ion batteries, nickel metal hydride batteries, or other similar devices.

The BESS 110 can include a battery management system (BMS) 115. The BMS 115 can include one or more electronic devices that monitor one or more of the battery energy storage devices 112, such as by protecting the battery energy storage device from operating outside a safe operating mode, monitoring a state of the battery energy storage device, calculating and reporting operating data for the battery energy storage device, controlling the battery energy storage device environment, and/or any other suitable control actions. For example, in several embodiments, the BMS 115 is configured to monitor and/or control operation of one or more energy storage devices 112. The BMS 115 can be, for example, a logic controller implemented purely in hardware, a firmware-programmable digital signal processor, or a programmable processor-based software-controlled computer.

The BESS 110 can optionally be coupled to a power converter 120. The power converter 120 can convert a DC voltage associated with BESS 110 to suitable AC power for the AC grid 150 (e.g. 50 Hz or 60 Hz power). In some embodiments, the power converter 120 can include a combination of DC to DC converters and DC to AC converters.

The power converter 120 can include one or more electronic switching elements, such as insulated gate bipolar transistors (IGBTs). The electronic switching elements can be controlled (e.g. using pulse width modulation) to charge or to discharge the battery energy storage system 110. In addition, the electronic switching elements can be controlled to convert the DC power received or provided to the BESS 115 to suitable AC power for application to utility grid 150 (e.g., 50 Hz or 60 Hz AC power). The power converter 120 can provide AC power to the grid 150 through a suitable transformer 140 and various other devices, such as switches, relays, contactors, etc. used for protection of the power system 100.

Figure 2:
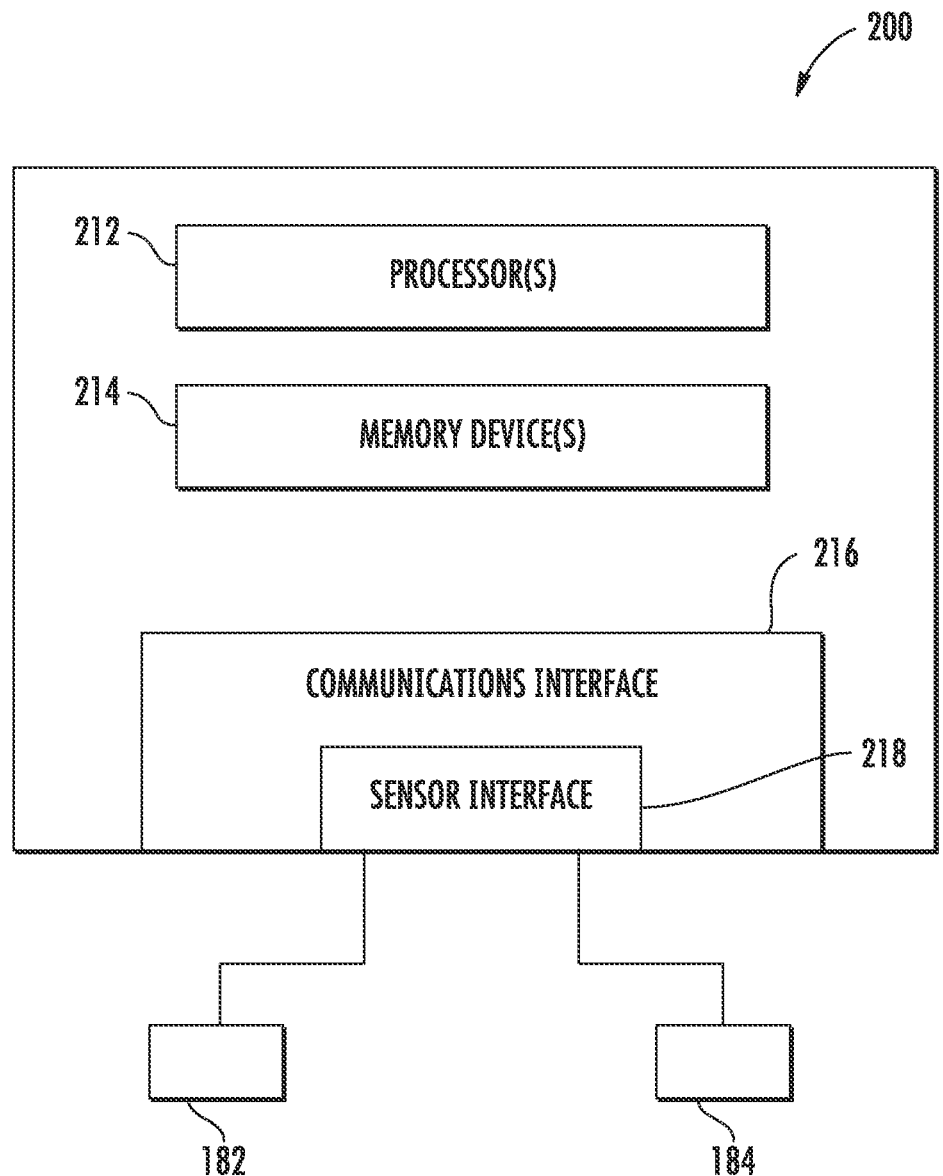
FIG. 2 depicts a control system according to example embodiments of the present disclosure.

The power system 100 can also include a control system 200 that is configured to monitor and/or control various aspects of the power system 100 and cooling system 180 as shown in FIGS. 1 and 2. In accordance with various embodiments, the control system 110 can include one or more separate units (as shown) or can be part of the BMS 115 of the BESS 110.

As shown, the control system 200 can be in communication with a cooling system 180. The cooling system 180 can include various components used to regulate the ambient temperature of a space 170 associated with the BESS 110. The space 170 can be the physical space, room, enclosure, housing, or other space associated with one or more of the battery energy storage units 112 in the BESS 110.

The cooling system 180 can be a heating, ventilation, and cooling (HVAC) system configured to regulate the ambient temperature of the space 170. In that regard, the cooling system 180 can include one or more air conditioning units, heating units, air handling units, blowers, ventilation fans, thermoelectric cooling devices, heat pumps, chilled fluid temperature control loops (e.g., a liquid cooling system having chilled fluid flowing through one or more channels), and other devices.

In some embodiments, the control system 200 can be in communication with one or more temperature sensors, such as temperature sensor 182 and temperature sensor 184. Temperature sensor 182 can be configured to measure the ambient temperature of space 170. Temperature sensor 184 can be configured to measure the temperature of one or more of the battery energy storage units 112. Temperature sensors 182 and 184 can be any suitable temperature sensor, such as ambient air temperature sensors, thermometers, or other sensors suitable for measuring temperature. Those of ordinary skill in the art, using the disclosures provided herein, will understand that any temperature sensor can be used in conjunction with the embodiments without deviating from the scope of the present disclosure.

The cooling system 180 and/or control system 200 can receive signals from the temperature sensors 182 and 184 and use the signals to regulate the ambient temperature in the space 170. For instance, the control system 200 can use signal from the temperature sensor 182 as part of a closed loop control system for maintaining the ambient temperature of the space close to an ambient temperature set point. Signals from temperature sensor 184 can trigger the control system 200 to control the cooling system to cool the space 170 when the peak or average temperature of the one or more battery energy storage devices 112 exceeds a temperature threshold.

Referring particularly to FIG. 2, the control system 200 can have any number of suitable control devices. The control system 200 can include a system level controller for the power generation system or a controller of one or more individual BESS 110 or BMS 115. As shown, for example, the control system 200 can include one or more processor(s) 212 and one or more memory device(s) 214 configured to perform a variety of computer-implemented functions and/or instructions (e.g., performing the methods, steps, calculations and the like and storing relevant data as disclosed herein). The instructions when executed by the processor(s) 212 can cause the processor(s) 212 to perform operations according to example aspects of the present disclosure. For instance, the instructions when executed by the processor(s) 212 can cause the processor(s) 212 to implement one or more control modules.

Additionally, the control system 200 can include a communications module 216 to facilitate communications between the control system 200 and the various components of the system 100. Further, the communications module 216 can include a sensor interface 218 (e.g., one or more analog-to-digital converters) to permit signals transmitted from one or more sensors (e.g., sensors 182, 184) to be converted into signals that can be understood and processed by the processors 212. It should be appreciated that the sensors (e.g. sensors 182, 184) can be communicatively coupled to the communications module 218 using any suitable means, such as a wired or wireless connection. The signals can be communicated using any suitable communications protocol. As such, the processor(s) 212 can be configured to receive one or more signals from the sensors 182 and 184.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 212 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 214 can generally be configured to store suitable computer-readable instructions that, when implemented by the processor(s) 212, configure the control system 200 to perform the various functions as described herein.

Figure 3:
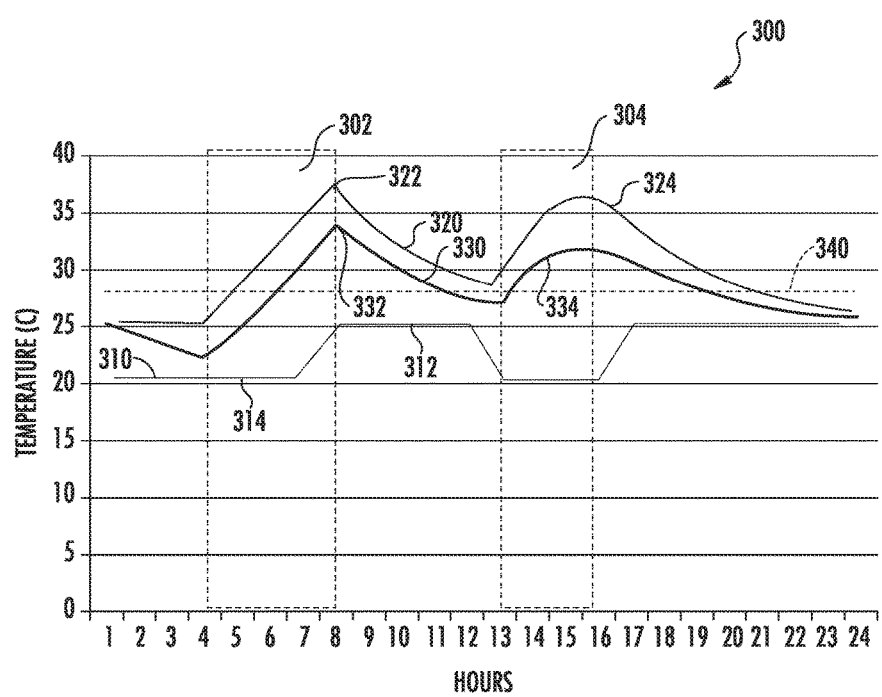
FIG. 3 depicts a graphical representation of a control scheme according to example embodiments of the present disclosure.

FIG. 3 depicts a graphical representation 300 of an example control scheme for an energy storage system according to example embodiments of the present disclosure. FIG. 3 plots time in hours along the abscissa and temperature in Celsius along the ordinate. Windows 302 and 304 represent periods of increased battery temperature identified, for instance, from a battery charge profile according to example embodiments of the present disclosure. Window 302 can correspond to a period of increased battery temperature attributable to discharging of a battery energy storage device. Window 304 can correspond to a period of increased battery temperature attributable to charging of the battery energy storage device.

Curve 310 represents the ambient temperature of a space associated with the battery energy storage device. In the example of FIG. 3, the ambient temperature set point varies between a first nominal temperature 312 and a second adjusted temperature 314. The nominal temperature 312 can be associated with a nominal temperature set point used to maintain the ambient temperature of the space associated with the one or more battery energy storage devices during nominal operating conditions. The adjusted temperature 314 can be reduced relative to the nominal temperature 312 and can be associated with an adjusted temperature set point used to reduce the ambient temperature of the during a pre-cooling period.

Curve 320 represents the temperature of the battery energy storage device when maintaining the ambient temperature of the space at a constant temperature (e.g., 25° C.) as is known in the art. Curve 330 represents the temperature of the battery energy storage device when controlling the ambient temperature of the space according to example aspects of the present disclosure.

As demonstrated in FIG. 3, in the time period prior to and during window 302 associated with the period of increased battery temperature attributable to discharging the battery energy storage device, the ambient temperature of the space is maintained at the reduced adjusted temperature 314. This causes the temperature of the battery energy storage device to drop as illustrated by curve 330. As a result, the peak temperature reached by the battery energy storage device during the window 302 is reduced. As shown, peak 332 for curve 330 is reduced relative to peak 322 for curve 320.

Similarly, in the time period prior to and during window 304 attributable to charging of the battery energy storage device, the ambient temperature of the space is maintained at a reduced temperature 314. Accordingly, the peak temperature reached by the battery energy storage device during window 304 is reduced. For instance, peak 334 is reduced relative to peak 324. In addition, the average temperature of the battery energy storage device represented by curve 340 is also reduced. In this way, controlling the ambient temperature of the space associated with the battery energy storage device according to example aspects of the present disclosure can result in reduced peak and average temperatures of the battery energy storage device without having to constantly maintain the ambient temperature at a reduced level.

Figure 4:
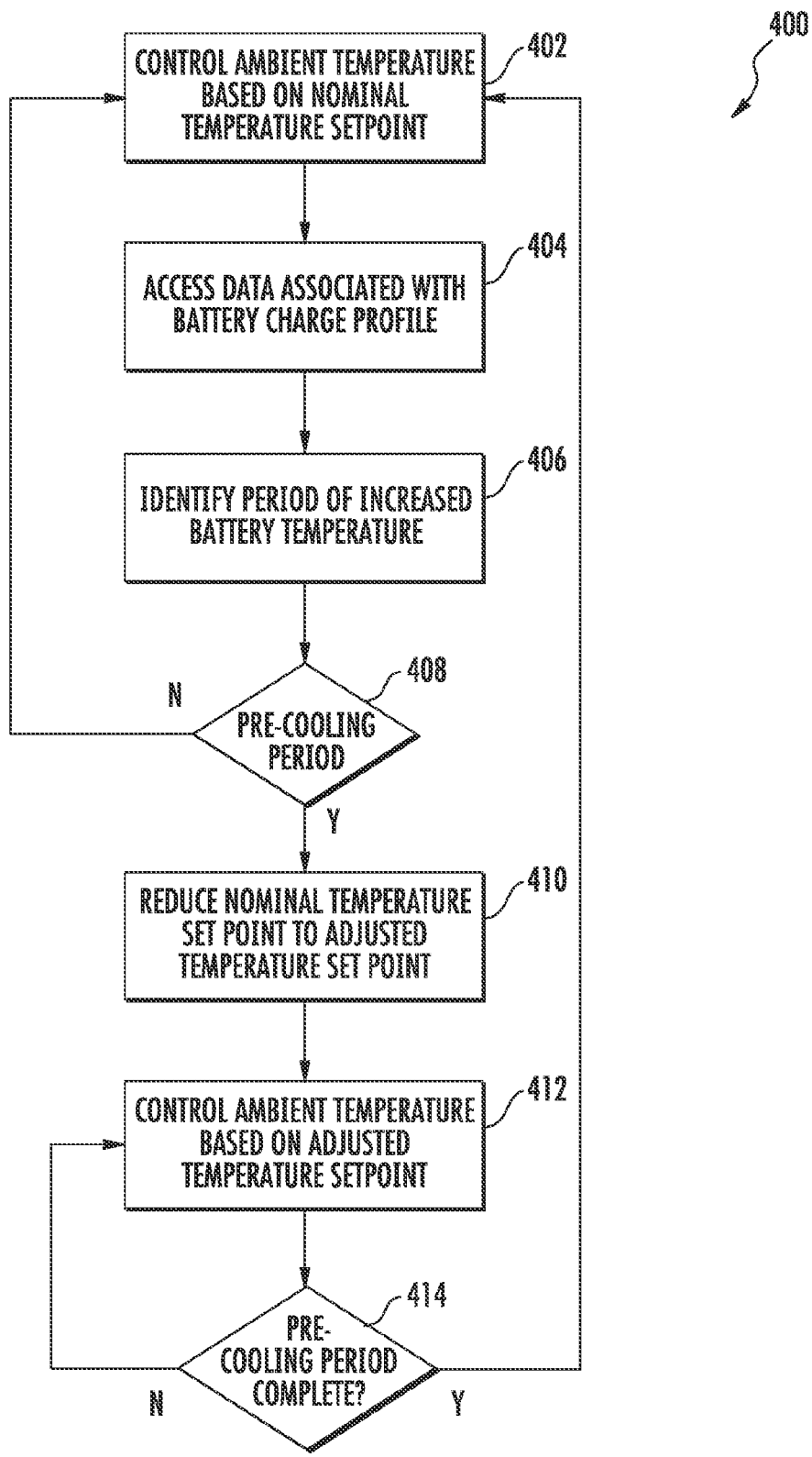
FIG. 4 depicts a flow diagram of an example method according to example embodiments of the present disclosure.

FIG. 4 depicts a flow diagram of an example method (400) for regulating the temperature of an energy storage system according to example embodiments of the present disclosure. The method can be implemented in any suitable power system, such as the power system 100 of FIG. 1. In addition, FIG. 4 depicts steps performed in a particular order for purposes of illustration and discussion. Those of ordinary skill in the art, using the disclosures provided herein, will understand that various steps of any of the methods disclosed herein can be omitted, rearranged, modified, expanded, or adapted in various ways without deviating from the scope of the present disclosure.

At (402), the method includes controlling the ambient temperature of a space associated with one or more energy storage devices based at least in part on a nominal temperature set point. For instance, a control system can provide a signal indicative of a nominal temperature set point to a cooling system. The cooling system can control the ambient temperature of the space based on the nominal temperature set point. For instance, the cooling system can receive signals indicative of ambient temperature of the space from an ambient temperature sensor and control the temperature of the space such that the ambient temperature is close to or at the nominal temperature set point. In some embodiments, the cooling system can regulate the temperature by, for instance, adjusting compressor speed and blower speed associated of an HVAC system to cool the ambient temperature of the space.

At (404), the method can include accessing data associated with a battery charge profile. The data associated with the battery charge profile can be indicative of periods when the battery is charging or discharging. The battery charge profile can be a preset or predefined battery charge profile with specific times for the charging and the discharging of the one or more battery energy storage devices. In other embodiments, the battery charge profile can be a predicted battery charge profile predicted using, for instance, predictive model control techniques based on various operations parameters (e.g. state of charge) and constraints.

At (406), the method includes identifying a period of increased battery temperature from the battery charge profile. The period of increased battery temperature can correspond to the charging of the one or more battery energy storage devices or to the discharging of the one or more battery energy storage devices.

At (408), the method can include determining whether the system is operating during a pre-cooling period. The pre-cooling period can be a period of time determined based at least in part on the period of increased battery temperature. The pre-cooling period can have a start time and an end time. The start time can be a predetermined amount of time before the start of the period of increased battery temperature. In other embodiments, the start time can be determined based at least in part on various parameters, such as the length of the period of increased battery temperature or the intensity and/or magnitude of the anticipated temperature increase during the period of increased battery temperature.

The end time for the pre-cooling period can be determined based on a desired duration of the pre-cooling period. In some embodiments, the duration can be a preset duration. In some embodiments, the duration of the pre-cooling period can be determined based on the duration of the period of increased battery temperature. For instance, the duration of the pre-cooling period can be determined to end at a time based on the ending of the period of increased battery temperature. In one embodiment, the duration of the period of reduced temperature operation can be determined to end at the same time as the period of increased temperature operation. Other suitable techniques can be used to determine the duration of the pre-cooling period without deviating from the scope of the present disclosure.

When it is determined that the system is not operating in a pre-cooling period at (408), the method continues to control the ambient temperature of the space based on the nominal temperature set point as shown at (402). When the system is operating during the pre-cooling period, the method proceeds to (410) wherein the ambient temperature set point is reduced from the nominal temperature set point to an adjusted temperature set point (410). The adjusted temperature set point can be less than the nominal temperature set point.

The method can then include controlling the ambient temperature of the space based on the adjusted temperature set point (412). For instance, the method can include adjusting compressor speed and blower speed associated with the cooling system to cool the ambient temperature of the space associated with the battery energy storage device to maintain the temperature at or about at the adjusted temperature set point (412).

At (414), the method can determine whether the duration of the pre-cooling period has been completed. If the duration of the pre-cooling period has not yet been completed, the method continues to control the ambient temperature of the space based on the adjusted temperature set point (412). When it is determined that the pre-cooling period has been completed, the method returns to (402) where the ambient temperature of the space is controlled based at least on a nominal temperature set point. In this way, the method can reduce the peak and average temperatures of the battery energy storage devices without having to consistently maintain the ambient temperature at the reduced ambient temperature associated with the adjusted ambient temperature set point.

Figure 5:
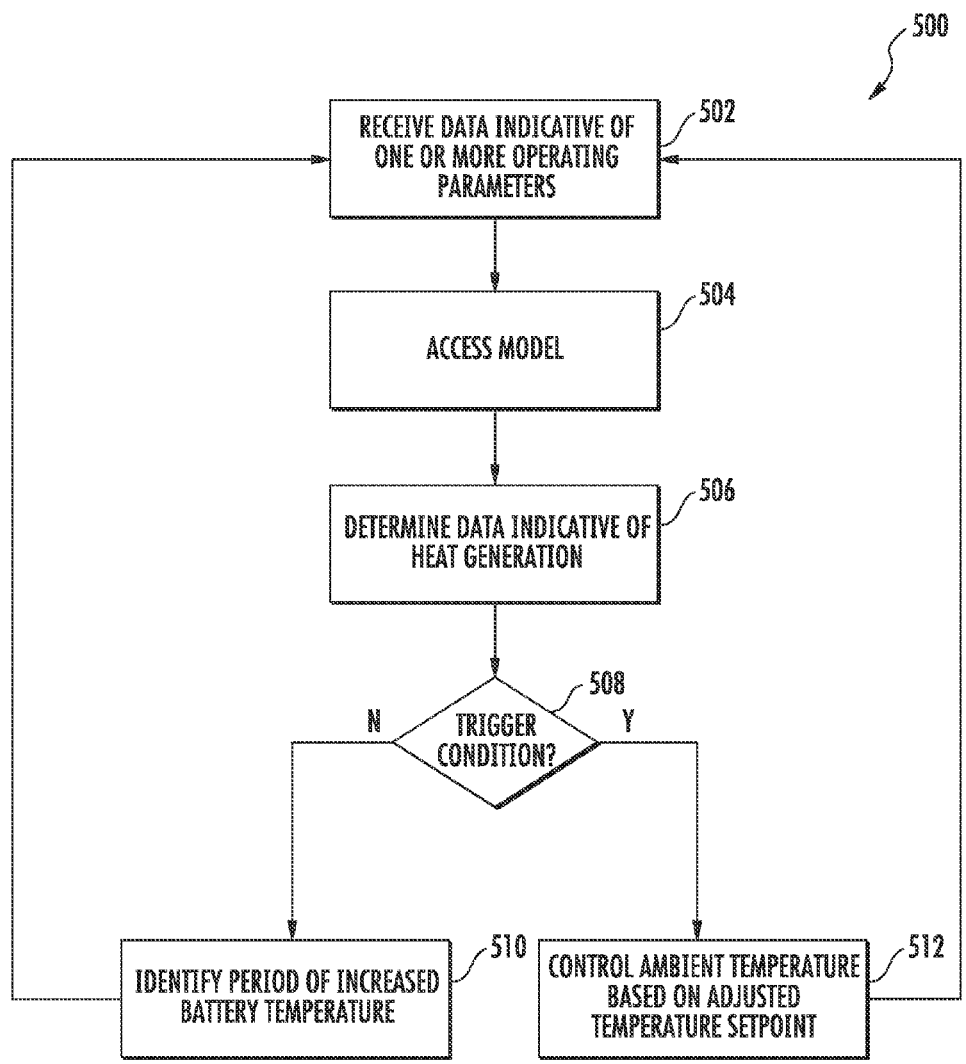
FIG. 5 depicts a flow diagram of an example method according to example embodiments of the present disclosure.

Example aspects of the present disclosure can also include predicting heat generation of the one or more battery energy storage units and cooling the space associated with the one or more battery energy storage units based on the heat generation. FIG. 5 depicts a flow diagram of one example method (500) of controlling the temperature of the energy storage system based on heat generation of the battery energy storage units according to example embodiments of the present disclosure.

At (502), the method includes receiving data indicative of one or more operating parameters associated with the battery energy storage devices. For instance, one or more sensors can measure operating parameters of the battery energy storage devices, such as battery temperature, ambient temperature of the space associated with the battery energy storage devices, state of charge, current (e.g., charging current, discharging current) and other operating parameters.

At (504), a model can be accessed that correlates heat generation of the battery energy storage devices as a function of the one or more operating parameters. The model can be implemented in the one or more control devices in any suitable form. For instance, the model can be implemented as an algorithm, look up table, control logic, or other suitable implementation.

The method can include determining data indicative of heat generation using the model based on the data indicative of the one or more operating parameters at (506). For instance, the model can be evaluated based on the one or more operating parameters to determine the data indicative of heat generation.

At (508), it can be determined whether a trigger condition has occurred based on the data indicative of heat generation. For instance, it can be determined whether the heat generated by the battery energy storage devices exceeds a threshold. If a trigger condition has not occurred, the cooling system can regulate the ambient temperature of the space associated with the battery energy storage devices according to one or more temperature set points (510). For instance, in one embodiment, the cooling system can be controlled in accordance with the method (400) of FIG. 4.

When a trigger has occurred, the cooling system can be controlled in a heat generation following mode (512). The heat generation following mode can control the cooling system to increase the cooling provided to the space associated with the battery energy storage devices to address the increased heat generation by the battery energy storage devices. In some embodiments, the amount and/or duration of additional cooling provided by the cooling system can be determined based at least on the amount of increased heat generation such that higher levels of heat generation result in higher levels of cooling (e.g., increased cooling, longer duration of cooling, etc.) in response to the heat generation.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for regulating a temperature of an energy storage system, comprising:
    accessing, by one or more control devices, a preset battery charge profile for one or more battery energy storage devices, the preset battery charge profile specifying one or more periods of time during which the one or more battery energy storage devices will be charged or discharged;
    identifying, by the one or more control devices, a period of increased battery temperature from the preset battery charge profile;
    determining, by the one or more control devices, whether the energy storage system is operating during a pre-cooling period that precedes the period of increased battery temperature, the pre-cooling period comprising a period of time determined based, at least in part, on the period of increased battery temperature; and
    responsive to determining the energy storage system is operating during the pre-cooling period, controlling, by the one or more control devices, operation of a thermal management system associated with the one or more battery energy storage devices to reduce an ambient temperature of a space associated with the one or more battery energy storage devices.

2. The method of claim 1, wherein the period of increased battery temperature corresponds to a discharge period for the one or more battery energy storage devices.

3. The method of claim 1, wherein the period of increased battery temperature corresponds to a charge period for the one or more battery energy storage devices.

4. The method of claim 1, wherein controlling, by the one or more control devices, a cooling system comprises reducing an ambient temperature set point to an adjusted temperature set point for the cooling system.

5. The method of claim 4, wherein subsequent to reducing the ambient temperature set point, the method comprises controlling the cooling system based at least in part on a nominal temperature set point, the nominal temperature set point being greater than the adjusted temperature set point.

6. The method of claim 1, wherein the cooling system comprises one or more of a heating ventilation and cooling (HVAC) system, liquid cooling system, air handling unit, ventilation fan, or electrical cooling device.

7. The method of claim 1, wherein the method further comprises:
    receiving, by the one or more control devices, data indicative of one or more operating parameters of the one or more battery energy storage devices;
    determining, by the one or more control devices, data indicative of heat generation of the one or more battery energy storage devices based at least in part on the one or more operating parameters; and
    controlling, by the one or more control devices, the cooling system to provide increased cooling of the one or more battery energy storage devices based at least in part on the data indicative of heat generation.

8. The method of claim 7, wherein the data indicative of increased heat generation is determined based on a model specifying heat generation as a function of the one or more operating parameters.

9. The method of claim 7, wherein the one or more operating parameters comprises one or more of ambient temperature, battery temperature, current, or state of charge associated with the one or more battery energy storage devices.

* * * * *